United States Patent
Anscher

Patent Number: 5,475,901
Date of Patent: Dec. 19, 1995

[54] SWIVELLING SNAPHOOK

[75] Inventor: Joseph A. Anscher, Port Washington, N.Y.

[73] Assignee: National Molding Corporation, Farmingdale, N.Y.

[21] Appl. No.: 947,241

[22] Filed: Sep. 18, 1992

[51] Int. Cl.[6] .................................................. A44B 13/00
[52] U.S. Cl. ............................ 24/265 H; 24/600.9; 24/905
[58] Field of Search .......................... 24/265 H, 265 EE, 24/265 AL, 600.3, 601.2, 598.9, 598.5, 599.1, 185, 905, 318, 621, 622, 623

[56] References Cited

U.S. PATENT DOCUMENTS

| | | |
|---|---|---|
| 370,333 | 9/1887 | Huff . |
| 384,512 | 6/1888 | Dillon . |
| 548,694 | 10/1895 | Breul . |
| 720,378 | 2/1903 | Phillips . |
| 759,630 | 5/1904 | Page .......................................... 24/905 |
| 765,812 | 7/1904 | Carlson . |
| 872,270 | 11/1907 | Bellinger . |
| 940,738 | 11/1909 | Schleicher . |
| 1,059,812 | 4/1913 | Barry ......................................... 24/905 |
| 1,804,377 | 5/1931 | Freysinger . |
| 3,127,652 | 4/1964 | Springer ................................. 24/598.5 |
| 3,128,520 | 4/1964 | Carter et al. . |
| 4,304,403 | 12/1981 | Wilson . |
| 4,577,374 | 3/1986 | Lii . |
| 4,599,767 | 7/1986 | Kasai . |
| 4,617,704 | 10/1986 | Kasai . |
| 4,644,611 | 2/1987 | Tanaka . |
| 4,665,592 | 5/1987 | Kasai . |
| 4,868,954 | 9/1989 | Kasai . |
| 5,127,137 | 7/1992 | Krauss ................................. 24/265 H |
| 5,146,657 | 9/1992 | Frano ................................... 24/265 H |
| 5,187,844 | 2/1993 | Simond . |

*Primary Examiner*—Victor N. Sakran
*Attorney, Agent, or Firm*—Kenyon & Kenyon

[57] ABSTRACT

A swivelling snaphook is provided having a retainer rotatably connected with a hook member. The retainer includes a receptacle, a base bar with opposing ends, and two converging bars having opposite ends with one of the opposite ends of each converging bar being joined to the receptacle and the other of the opposite ends joined to a different one of the opposing ends of the base bar. The receptacle includes a tapered orifice extending therethrough. The receptacle also includes at least one slit formed therein. The hook member includes a hook body and an insertion member for engaging the receptacle in the retainer.

22 Claims, 4 Drawing Sheets

5,475,901

SWIVELLING SNAPHOOK

TECHNICAL FIELD OF THE INVENTION

This invention relates generally to hooks and more particularly to swivelling snaphooks.

BACKGROUND OF THE INVENTION

Swivelling snaphooks generally comprise a hook member rotatably connected with a retainer that is adapted to receive a strap or some type of carrying member. In one prior art design, the retainer includes a shank with an enlarged portion and the hook member includes a receptacle with a slot formed therein adapted to receive the shank and the enlarged portion. One problem with this design is that when force is applied to the hook member during use, the receptacle may split open, causing the shank to be released.

Accordingly, one object of this invention is to provide an assembled swivelling snaphook comprising a hook member and a retainer that will withstand separation when a load is applied to the snaphook during use.

Another object of this invention is to provide a swivelling snaphook comprising a hook member and a retainer that can easily and securely be assembled.

ADVANTAGES AND SUMMARY OF THE INVENTION

One advantage of a swivelling snaphook in accordance with the present invention is that the hook member and the retainer can be easily and securely assembled.

Another advantage of a snaphook in accordance with the present invention is that the hook member and retainer assembly is unlikely to separate when a load is applied to the hook member during use. The receptacle is designed to close in on the shank of the hook member when a load is applied to the hook member, thereby inhibiting separation.

The present invention provides a swivelling snaphook having a retainer rotatably connected with a hook member. The retainer includes a receptacle, a base bar with opposing ends, and two converging bars having opposite ends with one of the opposite ends of each converging bar being joined to the receptacle and the other of the opposite ends joined to a different one of the opposing ends of the base bar. The receptacle includes a frustoconical shaped orifice extending therethrough. The receptacle also includes at least one slit formed therein. The hook member includes a hook body and an insertion member for engaging the receptacle in the retainer.

DETAILED DESCRIPTION

Figure 1:
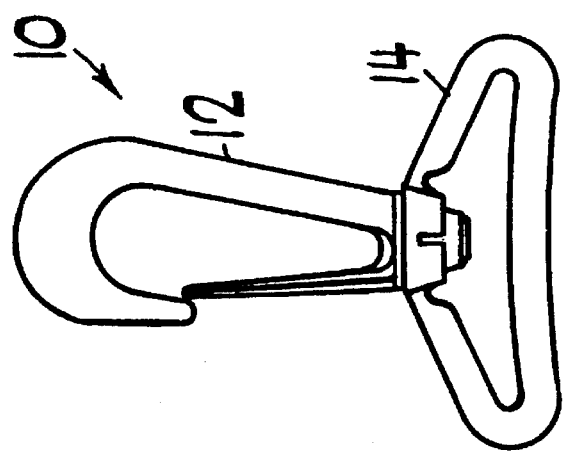
FIG. 1 is a front view of a swivelling snaphook in accordance with the invention.

FIG. 1 illustrates a swivelling snap hook 10 in accordance with the present invention. The swivelling snaphook 10 generally comprises a hook member 12 that is rotatably connected with a retainer 14, which is adapted to receive a strap or some type of a carrying member (not shown).

The hook member 12 and the retainer 14 are formed separately and then assembled to form the swivelling snaphook 10. They are preferably formed of molded plastic.

Figure 2:
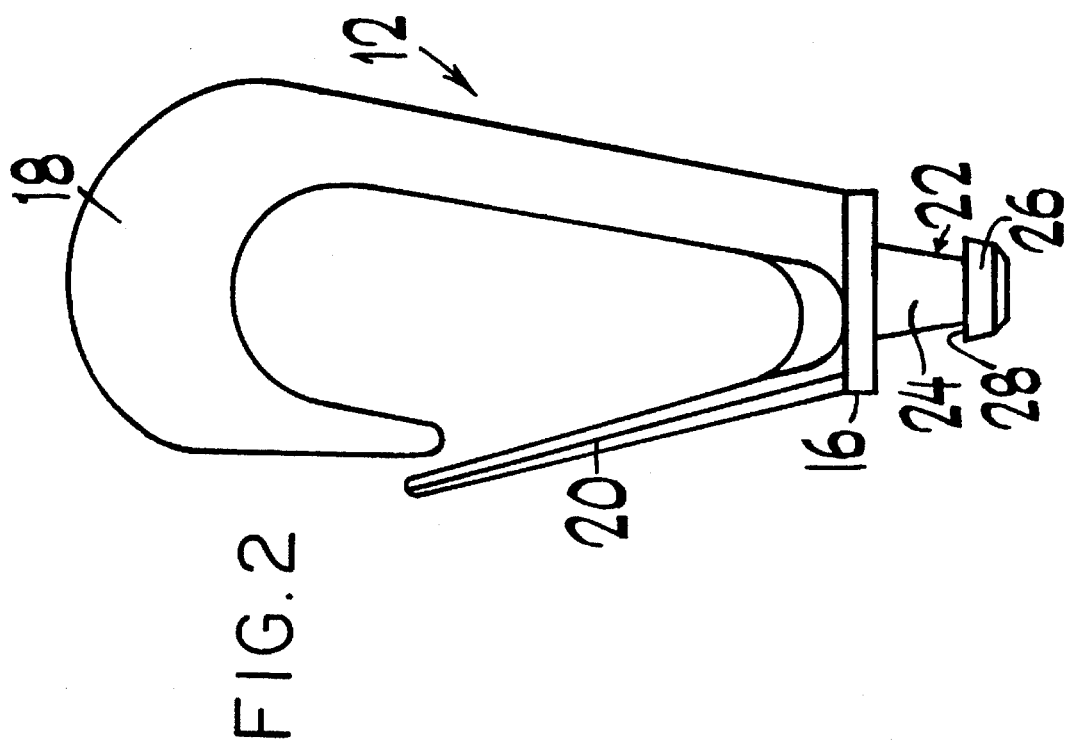
FIG. 2 is an enlarged view of a hook member, which forms part of the swivelling snaphook shown in FIG. 1.

FIG. 2 is an enlarged view of the hook member 12 forming part of the snaphook 10 shown in FIG. 1. The hook member 12 includes a base 16, from one side of which extends an open hook body 18 and a resiliently deformable closure tongue 20. The closure tongue 20 is biased toward the hook body 18 to enable the hook body 18 to be closed. Extending from the opposite side of the base 16 is an insertion member 22 adapted for engagement with the retainer 14. The insertion membership 22 comprises a shank 24 connected with an enlarged portion 26 having a cammed surface at its leading edge to facilitate insertion into the retainer 14. Both the shank 24 and the enlarged portion 26 may be tapered to facilitate insertion into the retainer 14. The enlarged portion 26 includes a rear shoulder 28 adjacent the shank 24.

Figure 3:
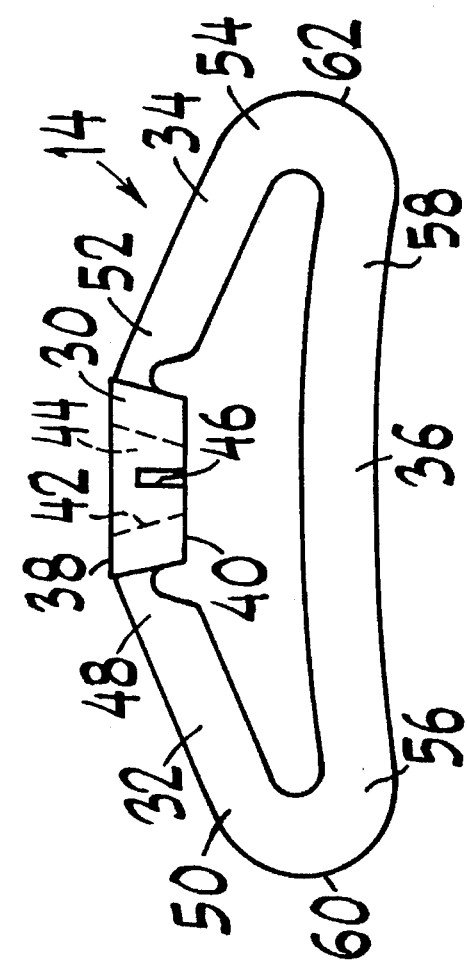
FIG. 3 is an enlarged view of a retainer, which also forms part of the swivelling snaphook shown in FIG. 1.

FIG. 3 is an enlarged view of the retainer 14 forming part of the snaphook 10 shown in FIG. 1. The retainer 14 includes a receptacle 30, a pair of converging bars 32 and 34, and a base bar 36. The receptacle 30 includes upper and lower surfaces 38 and 40. The receptacle 30 also includes a sloped annular internal wall 42 defining a tapered orifice 44 extending through the receptacle 30. The receptacle 30 also includes at least one slit 46 or weakened portion formed therein, extending from its lower surface 40 toward its upper surface 38. The slit 46 enables expansion of the orifice 44 during assembly with the hook member 12 as will be described in further detail with reference to FIGS. 5a–5c.

The shank 24 and the internal wall 42 of the receptacle 30 may be congruently shaped and sized to provide a rotatable engagement therebetween that is both axially and radially stable.

The converging bar 32 includes opposite ends 48 and 50, and the converging bar 34 includes opposite ends 52 and 54. The base bar 36, which is slightly curved, includes opposing ends 56 and 58. The ends 48 and 52 of the converging bars 32 and 34, respectively, are formed integrally with or joined to the receptacle 30. The end 50 of the converging bar 32 is formed integrally with or joined to the end 56 of the base bar 36, forming a rounded corner 60. Similarly, the end 54 of the converging bar 34 is formed integrally with or joined to the end 58 of the base bar 36, forming a rounded corner 62. The converging bars 32 and 34 thereby converge toward the receptacle 30 from the opposing ends of the base bar 36.

Figure 4A:
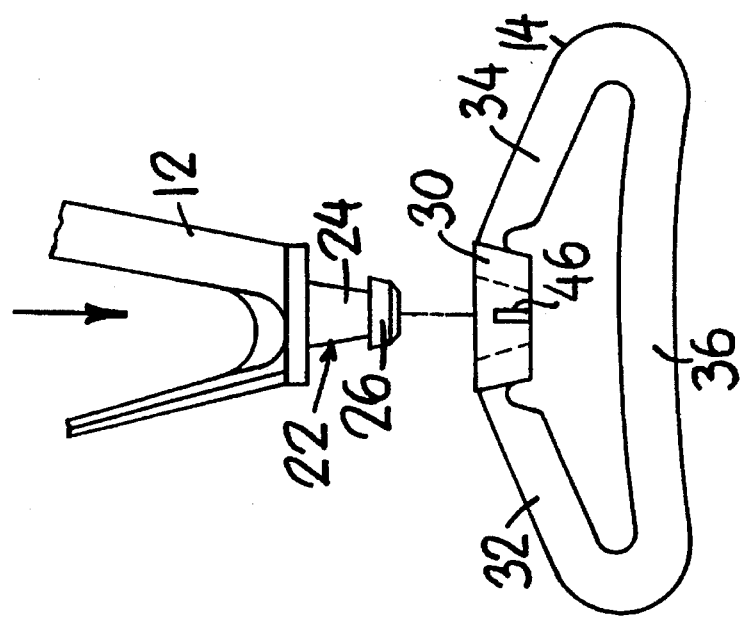
FIGS. 4a–4c are front views of the retainer shown in FIG. 3, illustrating its deformation during assembly with the hook member.
Figure 4B:
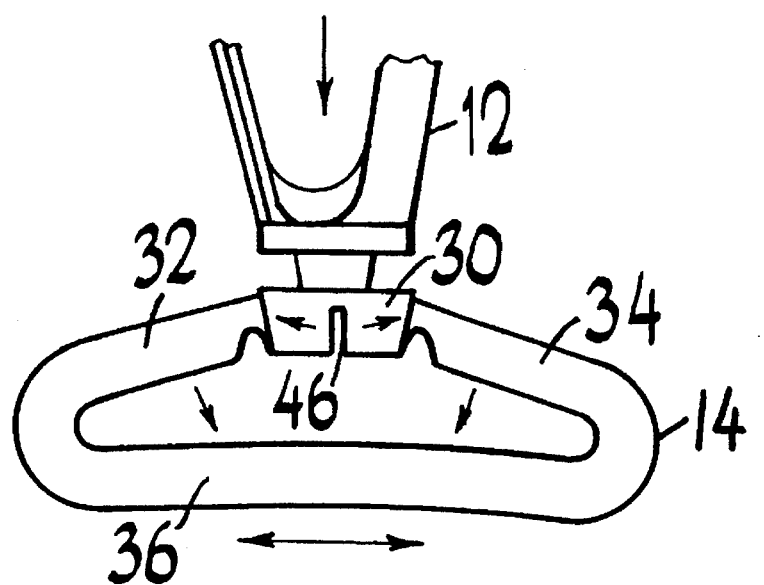
Figure 4C:
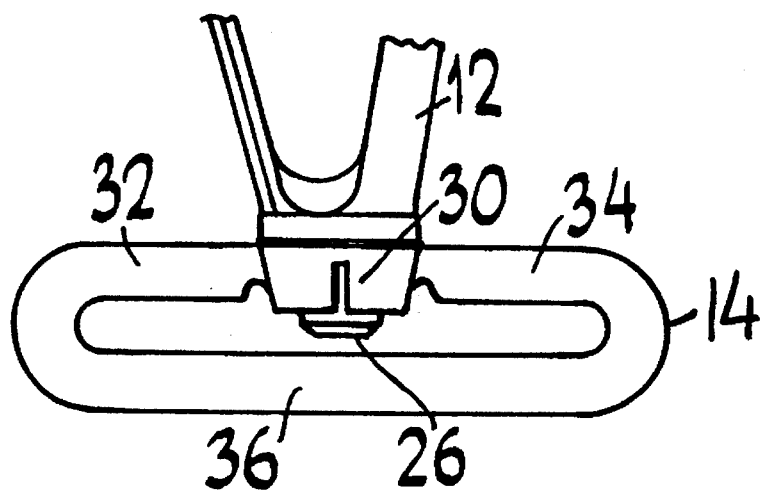

FIGS. 4a–4c illustrate the resilient deformation of the retainer 14 during assembly with the hook member 12. The retainer 14 is placed in a fixture or holding device (not shown) and the insertion member 22 of the hook member 12 is pressed into the receptacle 30. As shown in FIGS. 4b and 4c, as the enlarged portion 26 of the insertion member 22 is forced in the receptacle 30, the receptacle 30 moves slightly downward toward the base bar 36. Also, the base bar 36, which is slightly curved when it is not under stress, becomes generally straight. In addition, the converging bars 32 and 34 are driven downward and become generally horizontal. The hook member 12 continues to be pressed into the retainer 14 until the enlarged portion 26 clears the lower surface 40 of the receptacle 30. At this point, the converging bars 32 and 34 apply an upward force against the hook member 12 to ensure that the enlarged portion 26 has properly cleared the orifice 44, enabling it to be securely locked in the receptacle 30.

Figure 5C:
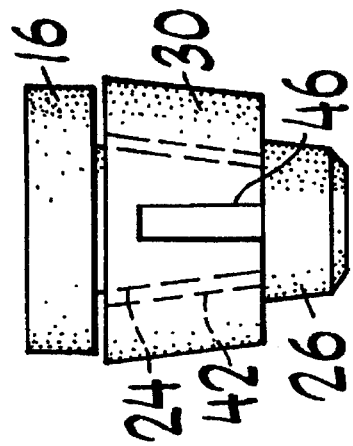
FIGS. 5a–5c are enlarged views of a receptacle forming part the retainer shown in FIG. 3, illustrating its deformation during assembly with the hook member.
Figure 5B:
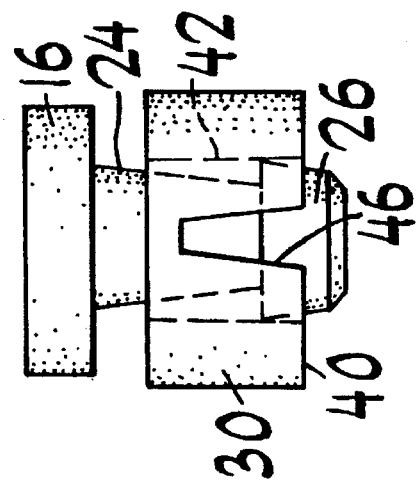
Figure 5A:
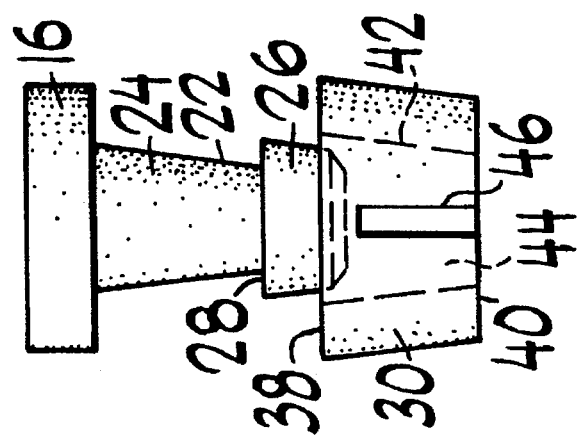

FIGS. 5a–5c illustrate the resilient deformation of the receptacle 30 during the assembly process. As shown in the figures, as the enlarged portion 26 is forced into the orifice 44 in the receptacle 30, the slit 46 opens and the sloped internal wall 42 defining the orifice 44 becomes generally vertical, thereby allowing the enlarged portion 26 to pass through. As the rear shoulder 28 of the enlarged portion 26 clears the lower surface 40 of the receptacle 30, the internal wall 42 returns to its normal sloped position, securely locking the shank 24 and enlarged portion 26 in place as shown in FIG. 5c.

Thus, one advantage of a swivelling snaphook in accordance with the present invention is that the hook member and the retainer can be easily and securely assembled.

Another advantage of a snaphook in accordance with the present invention is that the hook member and retainer assembly is difficult to separate when a load is applied to the hook member during use. The receptacle is designed to close in on the shank of the hook member when a load is applied to the hook member, thereby inhibiting separation.

Although the present invention has been described with respect to a specific preferred embodiment, various changes and modifications may be suggested to one skilled in the art. The present invention is intended to encompass such changes and modifications as fall within the scope of the appended claims.

I claim:

1. A swivelling snaphook, comprising:
   a retainer including a receptacle, a base bar with opposing ends, and two converging bars having opposite ends with one of said opposite ends of each converging bar being joined to said receptacle and the other of said opposite ends being joined to a different one of said opposing ends of said base bar, said receptacle including a frustoconical shaped orifice extending therethrough and said receptacle including at least one slit formed therein; and
   a hook member including a hook body and an insertion member for engaging said receptacle in said retainer, wherein portions of the receptacle adjacent the at least one slit are urged to close in around the insertion member when a load is applied to the snaphook during its use.

2. The swivelling snaphook of claim 1, wherein said receptacle includes upper and lower surfaces with said upper surface being proximate said hook body and wherein said slit extends from said lower surface toward said upper surface.

3. The swivelling snaphook of claim 1, wherein said insertion member comprises a shank and an enlarged portion.

4. The swivelling snaphook of claim 1, wherein said insertion member comprises a tapered shank and a tapered enlarged portion.

5. The swivelling snaphook of claim 1, wherein said base bar is curved to enable resilient deformation thereof during assembly of said retainer and said hook member.

6. The swivelling snaphook of claim 1, wherein said hook member and said receptacle comprise molded plastic.

7. The swivelling snaphook of claim 1, wherein said base bar is joined to said converging bars at a pair of rounded corners.

8. A swivelling snaphook, comprising:
   a hook member having a hook body at one end thereof and a tapered shank connected with a tapered enlarged portion at an opposite end thereof; and
   a retainer including a receptacle with a tapered orifice extending therethrough for receiving said tapered shank and said tapered enlarged portion, said retainer also including a base bar having opposing ends and a pair of converging bars, each having opposite ends with one of said opposite ends being joined to said receptacle and the other of said opposite ends being joined to a different one of said opposing ends of said base bar, and said receptacle including at least one slit formed therein, wherein an end of the receptacle proximate the tapered enlarged portion is pressured toward said tapered shank when a load is applied to the snaphook during its use.

9. The swivelling snaphook of claim 8, wherein said receptacle includes upper and lower surfaces with said upper surface being proximate said hook body and wherein said slit extends from said lower surface toward said upper surface.

10. The swivelling snaphook of claim 8, wherein said base bar is curved to enable resilient deformation thereof during assembly of said retainer with said hook member.

11. The swivelling snaphook of claim 8, wherein said hook member and said receptacle comprise molded plastic.

12. The swivelling snaphook of claim 8, wherein said base bar is joined to said converging bars at a pair of rounded corners.

13. A method of making a swivelling snaphook, comprising the steps of:
   forming a retainer comprising a receptacle, a base bar with opposing ends, and two converging bars having opposite ends with one of said opposite ends of each converging bar joined to said receptacle and the other of said opposite ends joined to a different one of said opposing ends of said base bar, said receptacle including a tapered orifice extending therethrough and said receptacle including at least one slit formed therein;
   forming a hook member comprising a hook body and an insertion member for engaging said receptacle in said retainer; and
   pressing said insertion member of said hook member into said receptacle of said retainer to assemble said snaphook, wherein said receptacle is urged to close in about said insertion member when a load is applied to the snaphook during its use.

14. The method of claim 13, wherein said step of pressing said insertion member into said receptacle comprises pressing said insertion member to cause said converging bars to flex toward said base bar for applying an upward force against said hook member to securely lock the insertion member in said receptacle.

15. A swivelling snaphook, comprising:
   a hook member including a hook body and an insertion member; and
   a retainer including a receptacle and a pair of converging members connected to said receptacle, said receptacle including a tapered orifice extending therethrough for receiving said insertion member therein, and said receptacle also including at least one slit therein located between locations at which the converging members are connected to said receptacle, said retainer also including a base bar connected to said converging members, wherein said converging members urge said receptacle toward said insertion member when a load is applied to the snaphook during its use.

16. The swivelling snaphook of claim 15, wherein said receptacle includes upper and lower surfaces with said upper surface being proximate said hook body and wherein said slit extends from said lower surface toward said upper surface.

17. The swivelling snaphook of claim 15, wherein said insertion member comprises a shank and an enlarged portion.

18. The swivelling snaphook of claim 15, wherein said insertion member comprises a tapered shank and a tapered enlarged portion.

19. The swivelling snaphook of claim 15, wherein said hook member and said retainer comprise molded plastic.

20. The swivelling snaphook of claim 15, wherein said tapered orifice has a frusto-conical shape.

21. The swivelling snaphook of claim 15, wherein said locations at which the converging members are connected to said receptacle are at generally opposite sides of said receptacle.

22. The swivelling snaphook of claim 15, wherein said base bar is curved to enable resilient deformation thereof during assembly of said retainer and said hook member.

* * * * *